(12) United States Patent
Shusterman

(10) Patent No.: US 8,028,320 B1
(45) Date of Patent: Sep. 27, 2011

(54) SYSTEM AND METHOD FOR PROVIDING MEDIA TO MEDIA PLAYBACK DEVICE

(75) Inventor: Alex Shusterman, Vienna, VA (US)

(73) Assignee: Nextel Communications, Inc., Reston, VA (US)

( * ) Notice: Subject to any disclaimer, the term of this patent is extended or adjusted under 35 U.S.C. 154(b) by 756 days.

(21) Appl. No.: 11/415,270

(22) Filed: May 2, 2006

(51) Int. Cl.
*H04N 7/173* (2011.01)

(52) U.S. Cl. ......................... 725/109; 725/110

(58) Field of Classification Search ............ 725/86–116; 380/201; 448/553; 386/94
See application file for complete search history.

(56) References Cited

U.S. PATENT DOCUMENTS

| | | | |
|---|---|---|---|
| 7,127,735 B1 * | 10/2006 | Lee et al. ......................... | 725/87 |
| 2001/0013128 A1 * | 8/2001 | Hagai et al. ..................... | 725/90 |
| 2002/0106081 A1 * | 8/2002 | Yang .............................. | 380/201 |
| 2002/0124262 A1 | 9/2002 | Basso et al. | |
| 2003/0149988 A1 * | 8/2003 | Ellis et al. ........................ | 725/87 |
| 2004/0003398 A1 * | 1/2004 | Donian et al. ................... | 725/34 |
| 2004/0103300 A1 * | 5/2004 | Risan et al. ..................... | 713/200 |
| 2004/0143848 A1 * | 7/2004 | Kerri Yu et al. ................. | 725/88 |
| 2004/0148638 A1 * | 7/2004 | Weisman et al. ............. | 725/115 |
| 2005/0097623 A1 | 5/2005 | Tecot et al. | |
| 2005/0108763 A1 | 5/2005 | Baran et al. | |
| 2005/0188409 A1 * | 8/2005 | Daniels .......................... | 725/88 |
| 2005/0216417 A1 * | 9/2005 | Risan et al. .................... | 705/52 |
| 2005/0251835 A1 | 11/2005 | Scott, III et al. | |
| 2006/0280437 A1 * | 12/2006 | Logan et al. .................... | 386/94 |

* cited by examiner

*Primary Examiner* — Joseph P Hirl
*Assistant Examiner* — An Nguyen

(57) ABSTRACT

Systems and methods for delivering media to media playback devices are provided. When a media playback device requests suspension of a media stream, the media is stored in a storage area associated with the media playback device. A media playback device can then request resumption of the media stream. The media playback device requesting resumption of the media stream can be the same or different from the device requesting suspension of the media stream.

16 Claims, 6 Drawing Sheets

SYSTEM AND METHOD FOR PROVIDING MEDIA TO MEDIA PLAYBACK DEVICE

BACKGROUND OF THE INVENTION

Recent advances in communication technology, such as improved compression techniques and other efficient bandwidth utilization techniques now allow different types of media to be accessed by a variety media playback devices. For example, some wireless network operators now offer streaming video to wireless mobile stations.

Some implementations of providing streaming video include the ability to have "VCR-like" controls, i.e., pause, rewind and fast forward. These implementations are provided by cable television companies, which employ a head-end location that stores and provides streaming video to set-top boxes in subscriber residences. The video is typically stored in a common storage medium that is accessible by any set-top box. Additionally, due to infrastructure limitations, cable television companies typically provide streaming video only over their existing wired infrastructure to set-top boxes.

SUMMARY OF THE INVENTION

In accordance with exemplary embodiments of the present invention, a media storage device stores a media stream in a storage area associated with a particular media playback device. Accordingly, when a resumption request is received, the stored media can be retrieved from the storage area and provided to a media playback device. In accordance with one aspect of the present invention, the storage area can be associated with an account for a number of media playback devices. Accordingly, the stored media can be retrieved by any media playback device associated with the account.

In accordance with exemplary embodiments of the present invention, the media can be stored independent of receiving a media suspension request, or in response to receiving the request. When the media is stored independent of the request, the media is transmitted to the media storage device from a media source, and the media storage device transmits the media to the media playback device. When the media is stored in response to receiving the request, the media can be sent from the media source to the media playback device independent of the media storage device. In this case the media will be provided to the media playback device from the media storage device only in response to a resumption request.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
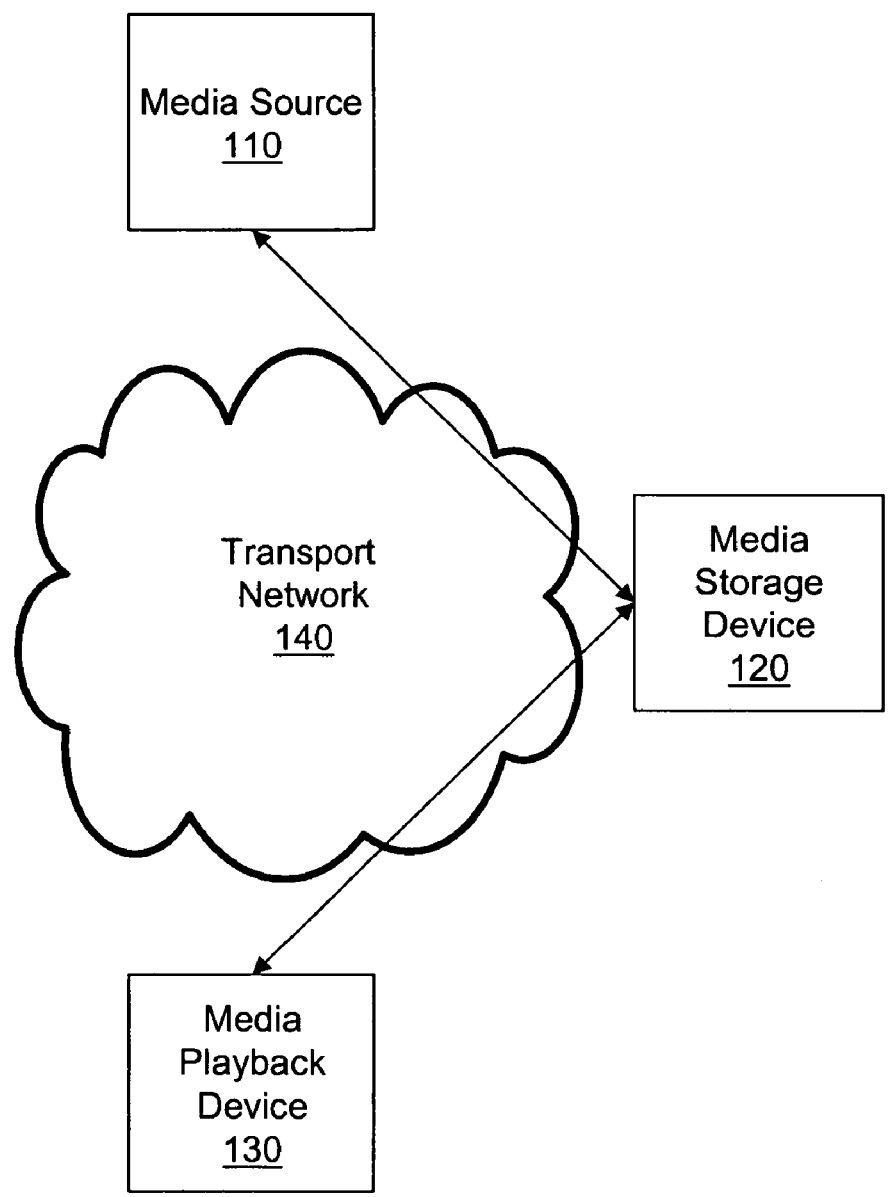
FIGS. 1a and 1b are block diagrams illustrating exemplary systems for providing media to media playback devices in accordance with the present invention.
Figure 1B:
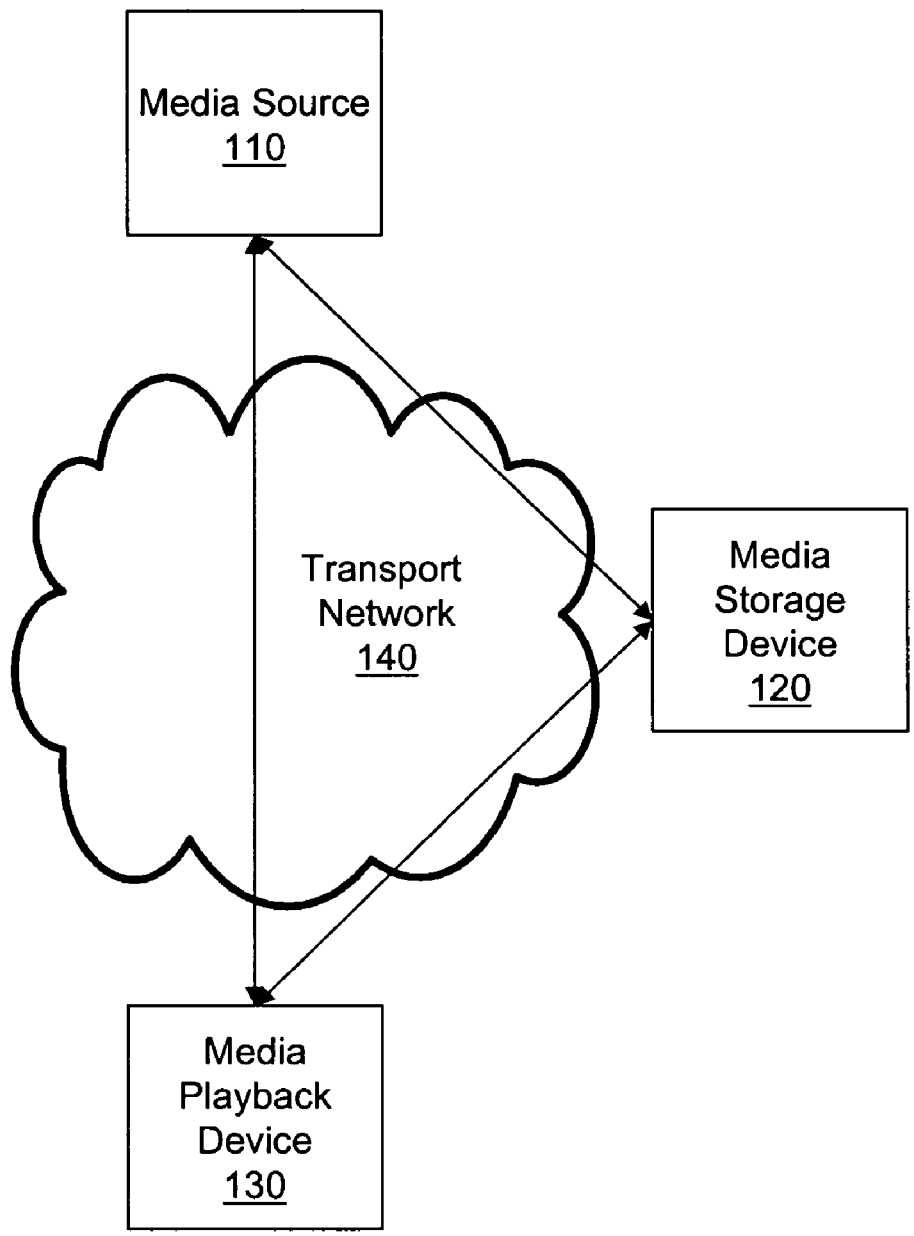

FIGS. 1a and 1b are block diagrams illustrating exemplary systems for providing media to media playback devices in accordance with the present invention. The systems include media source 110, media storage device 120, media playback device 130 and transport network 140.

Media source 110 can be any type of media source, including a source for a live media feed or a source that provides previously stored media. The media can be any type of media including, but not limited to, audio, video, audio/video, text, computer graphics, or any combination thereof.

Media storage device 120 can be any type of storage device, including a server, a processor and one or more memories (e.g., one or more hard drives, random access memory, read only memory and/or the like), and/or the like. Media storage device 120 includes a number of storage areas, each storage area associated with one or more media playback devices. Media playback device 130 can be any type of device capable of playback of media including, but not limited to, a mobile station, fixed station, computer, wireless telephone, personal digital assistant (PDA), handheld gaming device and/or the like.

Transport network 140 can be any type of network including a wired network, wireless network, a combination of different wired and/or wireless networks, and/or the like. Although FIGS. 1a and 1b illustrate the same transport network being employed for communications between media source 110 and media storage device 120, media storage device 120 and media playback device 130, and/or media source 110 and media playback device 130, these communications can occur over different transport networks.

In the system of FIG. 1a, media source 110 provides the media to media storage device 120, which in turn provides the media to media playback device 130. Media playback device 130 communicates a suspension request to media storage device 120 when it is desired to pause the media being provided to media playback device 130. Accordingly, media storage device 120 stores the media independent of receiving a suspension request from media playback devices.

In the system of FIG. 1b, media source 110 provides media directly to media playback device 130, i.e., the media can be provided independent of media storage device 120. Accordingly, media playback device 130 can send the suspension request to media storage device 120, which in turn notifies media source 110 to redirect the media stream to media storage device 120. Alternatively, or additionally, media playback device 130 can send a pause command to media source 110, which in turn, redirects the media stream to media storage device 120.

Figure 2A:
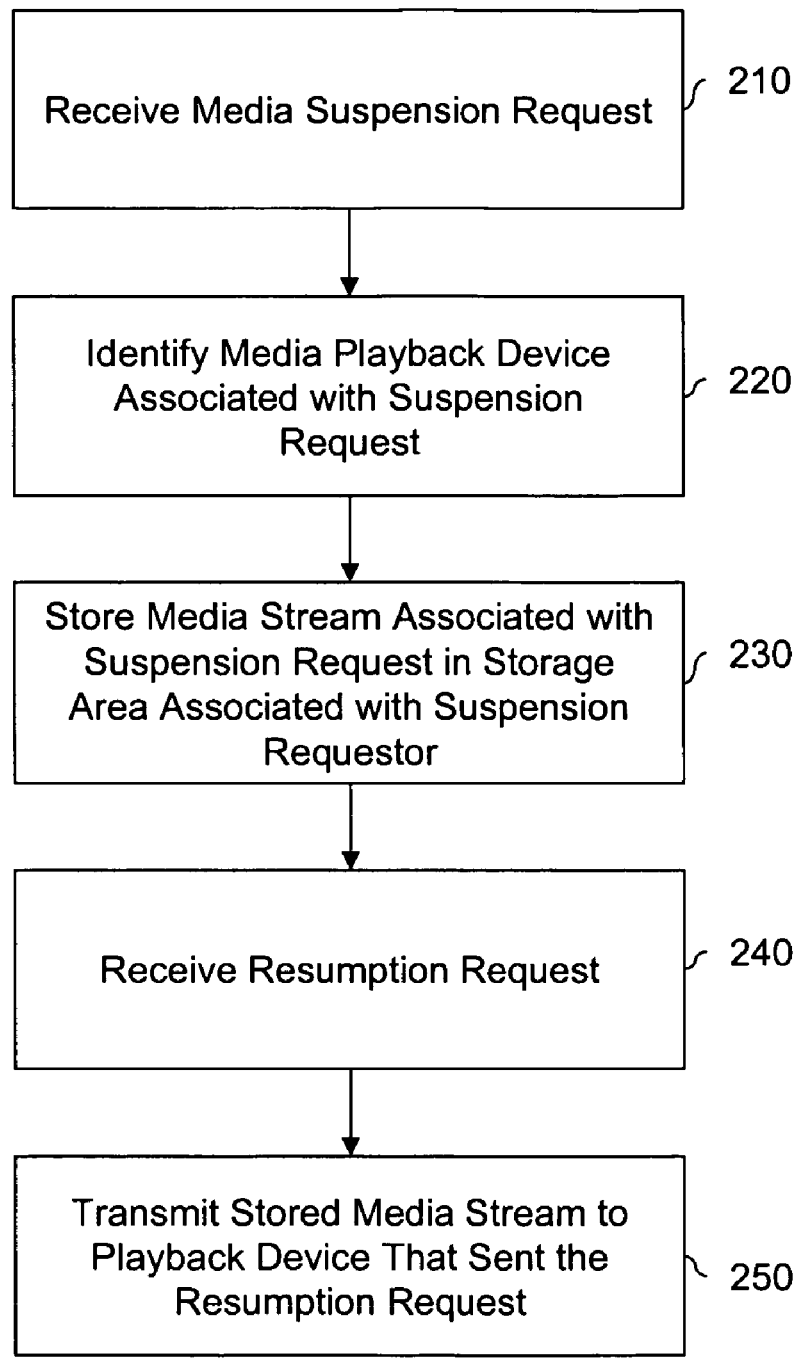
FIGS. 2a and 2b are flow diagrams illustrating exemplary methods for providing media to media playback devices in accordance with the present invention.
Figure 2B:
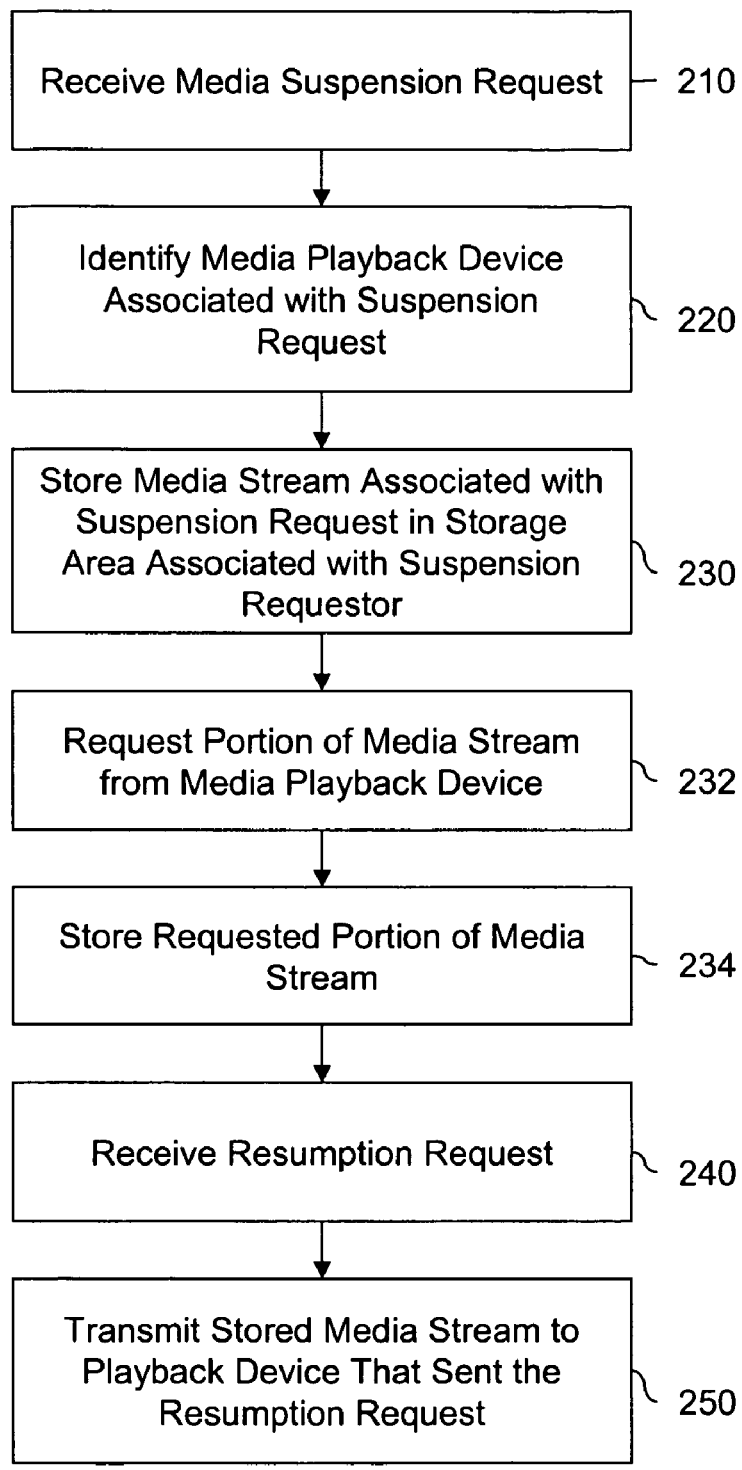

FIGS. 2a and 2b are flow diagrams illustrating exemplary methods for providing media to media playback devices in accordance with the present invention. The method of FIG. 2a corresponds to the system of FIG. 1a and the method of FIG. 2b corresponds to the system of FIG. 1b. Referring now to FIGS. 1a and 2a, when media storage device 120 receives a media suspension request (e.g., a pause command) from media playback device 130 (step 210), media storage device 120 identifies the media playback device associated with the suspension request (step 220). Media storage device 120 then stores the media stream associated with the suspension request in a storage area associated with the media playback device requesting the suspension (step 230). Media storage device 120 then stops transmitting the media to the media playback device. When media storage device 120 receives a resumption request (step 240), it begins to transmit the stored media stream to the playback device that sent the resumption request (step 250).

It should be noted that the media playback device sending the suspension request need not be the same media playback device sending the resumption request. For example, a number of media playback devices may be associated with each other, e.g., all being part of the same billing account. Accordingly, one device on the account, such as a mobile station, can send the suspension request, and a second device on the account, e.g., a set-top box, can send the resumption request. In this case a portion of the media can be viewed/heard on the mobile station, and the remainder can be viewed/heard on a television or monitor coupled to the set-top box.

The differences in the methods of FIG. 2a and FIG. 2b is due to the arrangement of the respective systems in FIGS. 1a and 1b. Specifically, in the system of FIG. 1a, the media being suspended is all routed through media storage device 120 on the way to media playback device 130. Accordingly, when a suspension request is received by media storage device 120, this device has a cache of the media provided to media playback device 130, and can "step back" in the media stream to a point in time corresponding to the approximate point in the media stream when the suspension request is sent from media playback device 130. In contrast, in the system in FIG. 1b, it is only after media playback device 130 transmits a suspension request does media storage device 120 begin to receive the media stream. Accordingly, some portion of the media stream sent to media playback device 130 after it has sent the suspension request will not arrive at media storage device 120. To address this situation, media storage device 120 is provided with this portion from either media source 110 or media playback device 130.

Referring now to FIG. 2b, when media storage device 120 receives a suspension request (step 210), it identifies the media playback device associated with the suspension request (step 220). Media storage device 120 instructs media source 110 to redirect the media to it. Media storage device 120 then begins to receive the media from media source 110, and stores the media stream associated with the suspension request in a storage area associated with the media playback device requesting suspension (step 230). Alternatively, media playback device 130 can send the suspension request to media source 110, which in turn reroutes the media stream to media storage device 120 and notifies media storage device 120 of the suspension request.

Media storage device 120 then requests a portion of the media stream from media playback device 130 (step 232), the portion corresponding to a portion that was delivered to the media playback device between the time the suspension request was transmitted from the media playback device and when the media stream was rerouted to media storage device 120. Media storage device 120 then stores the requested portion of the media stream (step 234). The media is not transmitted to a media playback device until a resumption request is received (step 240), at which time the media storage device 120 transmits the media stream to the playback device associated with the resumption request (step 250). As discussed above with regard to FIG. 2a, the media playback device requesting suspension need not be the same device requesting resumption of the media.

Figure 3A:
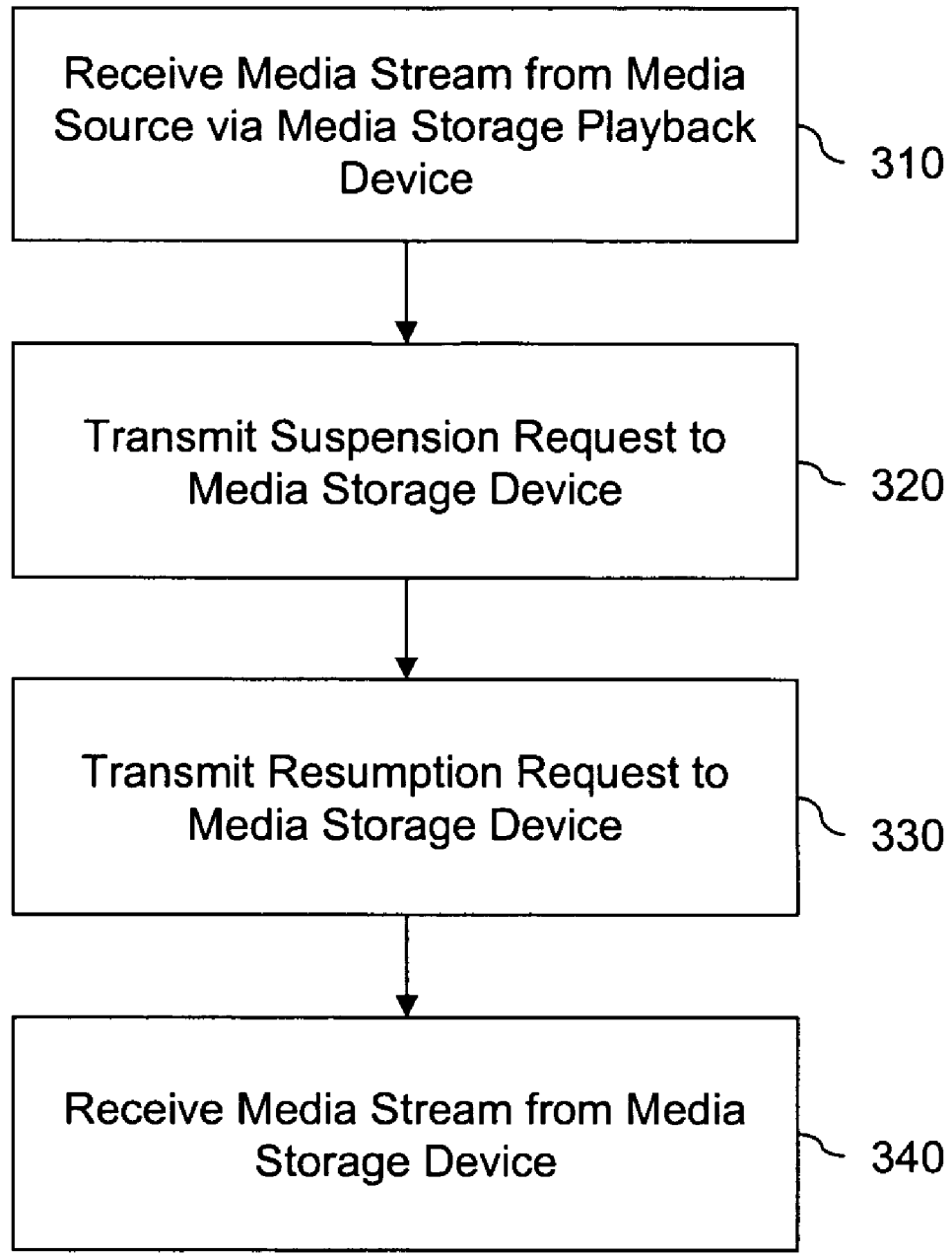
FIGS. 3a and 3b are flow diagrams illustrating exemplary methods for media playback devices in accordance with the present invention.
Figure 3B:
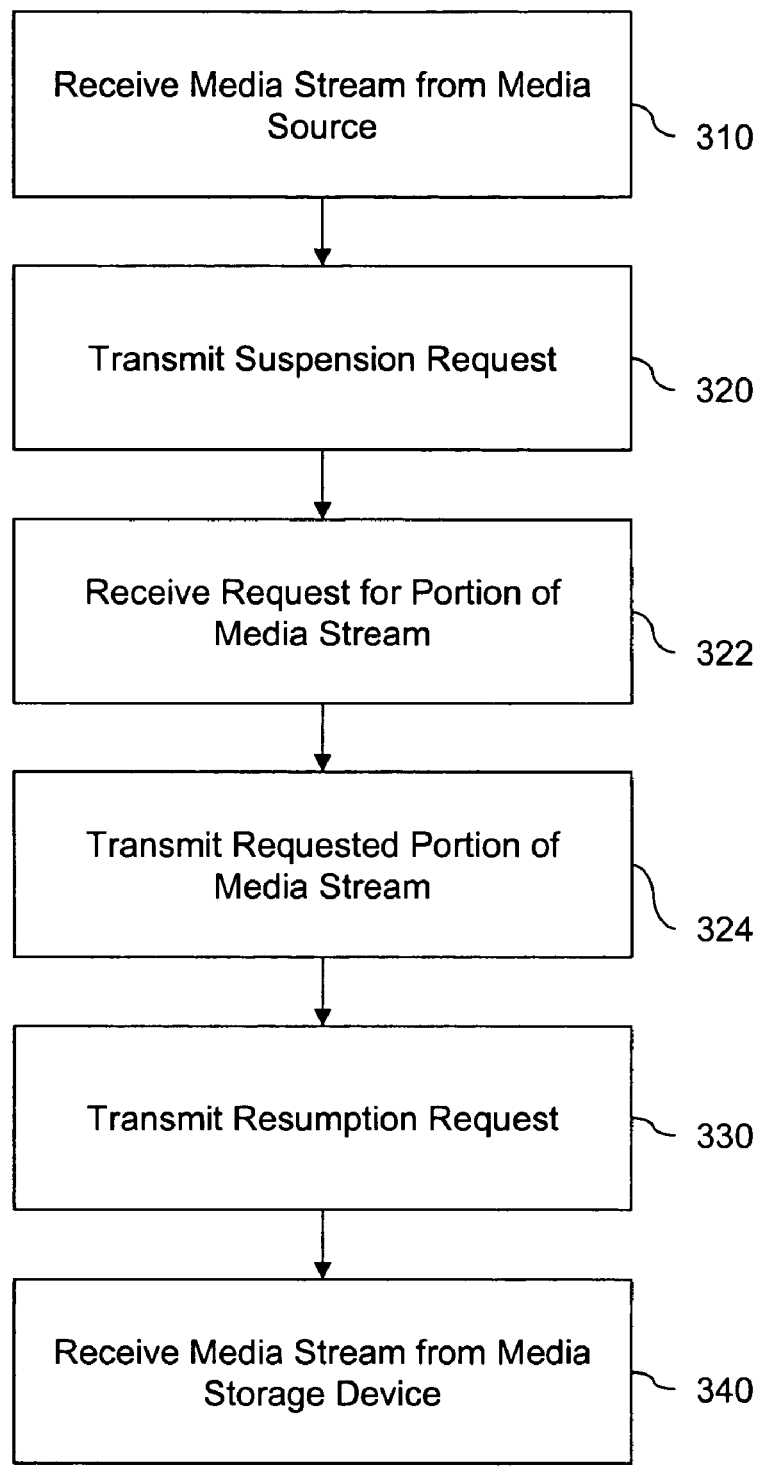

FIGS. 3a and 3b are flow diagrams illustrating exemplary methods for media playback devices in accordance with exemplary embodiments of the present invention. FIG. 3a corresponds to the system of FIG. 1a and FIG. 3b corresponds to the system of FIG. 1b. Referring now to FIGS. 1a and 3a, media playback device 130 receives a media stream from media source 110 via media storage device 120 (step 310). Media playback device 130 then transmits a suspension request to media storage device 120 (step 320), after which transmission of the media to media playback device 130 is suspended. When the media is again desired, media playback device 130 transmits a resumption request to media storage device 120 (step 330), after which media playback device 130 begins to receive the media stream from media storage device 120 from the point of suspension (step 340).

Referring now to FIGS. 1b and 3b, media playback device 130 receives a media stream from media source 110 (step 310). When media playback device 130 transmits a suspension request to either media source 110 or media storage device 120 (step 320), media playback device 130 receives a request for a portion of the media stream received subsequent to when the suspension request was transmitted (step 322). Media playback device 130 then transmits the requested portion of the media stream to media storage device 120 (step 324). After transmitting a resumption request (step 330), media playback device 130 receives the media stream from media storage device 120 (step 340).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing media to a media playback device, the method comprising the acts of:
   receiving, by a media storage device from a media playback device, a media suspension request;
   storing, by the media storage device, a second portion of a media stream from a media source, the second portion associated with the suspension request in a storage area associated with the media playback device;
   receiving, by the media storage device, a resumption request;
   transmitting, by the media storage device to the media playback device, a request for a first portion of the media stream that includes content from the media stream transmitted by the media source at a time of transmission of the media suspension request from the media playback device;
   receiving, by the media storage device from the media playback device the first portion of the media stream; and
   transmitting, by the media storage device, a resumption media stream in response to the resumption request that includes requested first portion of the media stream and the stored second portion of the media stream.

2. The method of claim 1, wherein the act of storing the second portion of the media stream is performed independent of the media suspension request.

3. The method of claim 1, wherein the act of storing the second portion of the media stream is performed in response to receipt of the media suspension request.

4. The method of claim 3, further comprising the acts of:
   receiving, by the media storage device, the requested second portion of the media stream; and
   storing the second requested portion with the stored first portion of the media stream in the storage area associated with the media playback device.

5. The method of claim 1, wherein the resumption media stream is transmitted to the media playback device.

6. The method of claim 1, wherein the resumption media stream is transmitted to another media playback device.

7. The method of claim 6, wherein the media playback device and the another media playback device are associated with a same account.

8. The method of claim 1, wherein the stored media stream is transmitted over a wired communication network.

9. The method of claim 1, wherein the stored media stream is transmitted over a wireless communication network.

10. The method of claim 9, wherein the wireless communication network is a cellular wireless network.

11. A method for receiving media by a media playback device, the method comprising the acts of:
- receiving, by a media playback device, a media stream from a media source;
- transmitting, by the media playback device to a media storage device, a suspension request;
- transmitting, by the media playback device to the media storage device, the first portion of the media stream;
- transmitting, by the media playback device to the media storage device, a resumption request;
- receiving, by the media playback device from the media storage device, a second portion of the media stream in response to the resumption request; and
- receiving, by the media playback device, a request to transmit from the media playback device a first portion of the media stream received by the media playback device, the requested portion including content transmitted by the media source at the time of the transmitting of the suspension request.

12. The method of claim 11, wherein the media stream received in response to the resumption request includes the first portion of the media stream.

13. The method of claim 11, wherein the media stream from the media source includes audio, video, audio/video, text or graphics.

14. The method of claim 11, wherein the media playback device communicates with the media source via a wireless network.

15. The method of claim 11, wherein the media playback device communicates with the media source via a wired network.

16. A method for receiving media by a media playback device, the method comprising the acts of:
- receiving, by a media playback device, a media stream from a media source;
- transmitting, by the media playback device to a media storage device, a suspension request;
- transmitting, by the media playback device to the media storage device, a first portion of the media stream that includes content received by the media playback device at a time of the transmitting of the suspension request;
- transmitting, by the media playback device to the media storage device, a resumption request; and
- receiving, by the media playback device to the media storage device, the media stream in response to the resumption request,
- wherein the media stream received in response to the resumption request includes the first portion of the media stream received by the media playback device and a second portion of the media stream that includes content transmitted by the media source after the media storage device receives the suspension request.

* * * * *